(12) United States Patent
Dharmaji

(10) Patent No.: US 9,189,794 B2
(45) Date of Patent: Nov. 17, 2015

(54) METHOD AND APPARATUS FOR MAXIMIZING BRAND EXPOSURE IN A MINIMAL MOBILE DISPLAY

(75) Inventor: Srinivasa Dharmaji, Cupertino, CA (US)

(73) Assignee: GOLDSPOT MEDIA, INC., Sunnyvale, CA (US)

( * ) Notice: Subject to any disclaimer, the term of this patent is extended or adjusted under 35 U.S.C. 154(b) by 574 days.

(21) Appl. No.: 13/078,638

(22) Filed: Apr. 1, 2011

(65) Prior Publication Data

US 2011/0184810 A1 Jul. 28, 2011

Related U.S. Application Data

(63) Continuation-in-part of application No. 13/078,297, filed on Apr. 1, 2011, and a continuation-in-part of application No. 12/368,141, filed on Feb. 9, 2009.

(60) Provisional application No. 61/065,258, filed on Feb. 11, 2008.

(51) Int. Cl.
*H04N 21/488* (2011.01)
*G06Q 30/02* (2012.01)

(52) U.S. Cl.
CPC ............ *G06Q 30/02* (2013.01); *G06Q 30/0267* (2013.01)

(58) Field of Classification Search
CPC ... G06F 1/1626; G06F 3/0485; G06F 3/0416; G06Q 30/0277; G06Q 30/0241; G06Q 30/0601; G06Q 20/325; G06Q 30/00; G06Q 30/0272; G06Q 30/0641; H04N 21/4886; H04N 5/2723; H04N 21/4316; H04M 3/4878

USPC ............................ 715/864; 705/14.64, 14.73
See application file for complete search history.

(56) References Cited

U.S. PATENT DOCUMENTS

| | | |
|---|---|---|
| 5,914,654 A | 6/1999 | Smith |
| 6,036,601 A | 3/2000 | Heckel |
| 6,067,008 A | 5/2000 | Smith |
| 6,070,149 A | 5/2000 | Tavor et al. |
| 6,137,834 A | 10/2000 | Wine et al. |
| 6,182,098 B1 | 1/2001 | Selker |
| 6,256,043 B1 | 7/2001 | Aho et al. |
| 6,314,451 B1 | 11/2001 | Landsman et al. |
| 6,317,885 B1 | 11/2001 | Fries |

(Continued)

FOREIGN PATENT DOCUMENTS

| | | |
|---|---|---|
| GB | 2404751 | 2/2005 |
| JP | 2005-259097 | 9/2005 |

*Primary Examiner* — Shen Shiau
(74) *Attorney, Agent, or Firm* — Michael A. Glenn; Perkins Coie LLP

(57) ABSTRACT

The delivery of targeted advertisements (ads) to wireless mobile handheld display devices (MHDDs) with client specific advertisement and dynamic content for response and feedback is becoming important in advertising. As the return for ads on MHDDs becomes higher, there is a push to show larger, complex, and more interactive ads on small displays. This has created a need to maximize the area available for ad viewing. The need also exists for increasing the engagement time of the ads. An embodiment of the invention establishes such capability by providing a rolled up ad display where the banner area is used to present a continuously rolling, rolled up ad, which is displayed on the screen at the ad spots by unrolling. Furthermore, the use of transparent hot-spots on the ad allows the whole display screen of the MHDD to be used for presentation of such large and complex ads.

11 Claims, 8 Drawing Sheets

(56) References Cited

U.S. PATENT DOCUMENTS

| Patent/Pub No. | Date | Inventor |
|---|---|---|
| 6,342,926 B1 | 1/2002 | Hanafee et al. |
| 6,362,817 B1 | 3/2002 | Powers et al. |
| 6,396,509 B1 | 5/2002 | Cheng |
| 6,448,980 B1 | 9/2002 | Kumar |
| 6,477,575 B1 | 11/2002 | Koeppel et al. |
| 6,496,857 B1 | 12/2002 | Dustin et al. |
| 6,505,169 B1 | 1/2003 | Bhagavath et al. |
| 6,519,571 B1 | 2/2003 | Guheen et al. |
| 6,647,257 B2 | 11/2003 | Owensby |
| 6,698,020 B1 | 2/2004 | Zigmond et al. |
| 6,711,552 B1 | 3/2004 | Kay |
| 6,714,992 B1 | 3/2004 | Kanojia et al. |
| 6,847,992 B1 * | 1/2005 | Haitsuka et al. .............. 709/218 |
| 6,915,012 B2 | 7/2005 | Osborne et al. |
| 6,920,606 B1 | 7/2005 | Jablonski et al. |
| 6,968,315 B1 | 11/2005 | Nakisa |
| 7,027,801 B1 | 4/2006 | Hall et al. |
| 7,062,469 B2 | 6/2006 | Meyers et al. |
| 7,162,226 B2 | 1/2007 | Papulov |
| 7,271,737 B1 | 9/2007 | Hoffberg |
| 7,343,317 B2 | 3/2008 | Jokinen et al. |
| 7,505,920 B2 | 3/2009 | Agarwal et al. |
| 7,516,201 B2 | 4/2009 | Kovacs et al. |
| 7,533,343 B2 | 5/2009 | Ratnakar et al. |
| 7,613,691 B2 | 11/2009 | Finch |
| 7,647,316 B2 | 1/2010 | Patel et al. |
| 7,650,617 B2 | 1/2010 | Hoshino et al. |
| 7,684,790 B2 | 3/2010 | Cartmell |
| 7,720,835 B2 | 5/2010 | Ward et al. |
| 7,724,783 B2 | 5/2010 | Shvodian et al. |
| 7,747,264 B2 | 6/2010 | Fiorini |
| 7,769,633 B2 | 8/2010 | Jokinen et al. |
| 7,775,440 B2 | 8/2010 | Silverbrook et al. |
| 7,778,636 B2 | 8/2010 | Rolf |
| 7,805,444 B2 | 9/2010 | Roche et al. |
| 7,856,372 B2 | 12/2010 | Ullah |
| 7,856,373 B2 | 12/2010 | Ullah |
| 7,861,260 B2 | 12/2010 | Shkedi |
| 8,009,608 B2 | 8/2011 | Karaoguz et al. |
| 8,132,202 B2 | 3/2012 | Swix et al. |
| 8,549,410 B2 | 10/2013 | Hoyle |
| 8,682,720 B1 * | 3/2014 | Wills et al. .................... 705/14.4 |
| 2001/0023436 A1 | 9/2001 | Srinivasan et al. |
| 2001/0034654 A1 | 10/2001 | Vigil et al. |
| 2001/0056405 A1 | 12/2001 | Muyres et al. |
| 2002/0046099 A1 | 4/2002 | Frengut et al. |
| 2002/0055968 A1 | 5/2002 | Wishoff et al. |
| 2002/0083445 A1 | 6/2002 | Flickinger et al. |
| 2002/0087397 A1 | 7/2002 | Mazza |
| 2002/0087976 A1 | 7/2002 | Kaplan et al. |
| 2002/0097893 A1 * | 7/2002 | Lee et al. ....................... 382/103 |
| 2002/0133405 A1 | 9/2002 | Newnam et al. |
| 2002/0154163 A1 * | 10/2002 | Melchner ...................... 345/749 |
| 2002/0166119 A1 | 11/2002 | Cristofalo |
| 2003/0004802 A1 | 1/2003 | Callegari |
| 2003/0028889 A1 | 2/2003 | McCoskey et al. |
| 2003/0131070 A1 | 7/2003 | Stroebel et al. |
| 2003/0137544 A1 | 7/2003 | Mears et al. |
| 2003/0151621 A1 | 8/2003 | McEvilly et al. |
| 2003/0188308 A1 | 10/2003 | Kizuka |
| 2004/0000311 A1 | 1/2004 | Brown et al. |
| 2004/0003118 A1 | 1/2004 | Brown et al. |
| 2004/0073947 A1 | 4/2004 | Gupta |
| 2004/0103120 A1 | 5/2004 | Fickle et al. |
| 2004/0122735 A1 | 6/2004 | Meshkin |
| 2004/0133480 A1 | 7/2004 | Domes |
| 2005/0044082 A1 | 2/2005 | Chande et al. |
| 2005/0149385 A1 | 7/2005 | Trively |
| 2005/0197164 A1 | 9/2005 | Chan |
| 2005/0209923 A1 | 9/2005 | Jablonski et al. |
| 2006/0020548 A1 * | 1/2006 | Flather ............................ 705/51 |
| 2006/0036488 A1 | 2/2006 | Golan et al. |
| 2006/0074769 A1 | 4/2006 | Looney |
| 2006/0089792 A1 | 4/2006 | Manber et al. |
| 2006/0136297 A1 | 6/2006 | Willis et al. |
| 2006/0168664 A1 | 7/2006 | Frank et al. |
| 2006/0259455 A1 | 11/2006 | Anderson et al. |
| 2006/0282758 A1 * | 12/2006 | Simons et al. ................. 715/500 |
| 2006/0294538 A1 | 12/2006 | Li et al. |
| 2007/0047002 A1 | 3/2007 | Hull et al. |
| 2007/0061204 A1 | 3/2007 | Ellis et al. |
| 2007/0061205 A1 | 3/2007 | Crolley |
| 2007/0078712 A1 | 4/2007 | Ott et al. |
| 2007/0088801 A1 | 4/2007 | Levkovitz et al. |
| 2007/0094082 A1 | 4/2007 | Yruski et al. |
| 2007/0101359 A1 | 5/2007 | Schiller et al. |
| 2007/0105536 A1 * | 5/2007 | Tingo ......................... 455/414.1 |
| 2007/0146200 A1 | 6/2007 | Norin et al. |
| 2007/0175998 A1 * | 8/2007 | Lev ............................... 235/454 |
| 2007/0198339 A1 | 8/2007 | Shen et al. |
| 2007/0204310 A1 | 8/2007 | Hua et al. |
| 2008/0004957 A1 | 1/2008 | Hildreth et al. |
| 2008/0033781 A1 | 2/2008 | Peretti |
| 2008/0040743 A1 | 2/2008 | Dharmaji et al. |
| 2008/0040768 A1 | 2/2008 | Robotham |
| 2008/0081640 A1 | 4/2008 | Tran et al. |
| 2008/0103875 A1 | 5/2008 | Kokernak et al. |
| 2008/0114762 A1 * | 5/2008 | Fukuda et al. ..................... 707/6 |
| 2008/0182563 A1 | 7/2008 | Wugofski et al. |
| 2008/0189735 A1 | 8/2008 | Barton et al. |
| 2008/0195468 A1 | 8/2008 | Malik |
| 2008/0201734 A1 | 8/2008 | Lyon et al. |
| 2008/0255943 A1 | 10/2008 | Morten et al. |
| 2008/0270886 A1 | 10/2008 | Gossweiler et al. |
| 2008/0288354 A1 | 11/2008 | Flinn et al. |
| 2008/0290987 A1 | 11/2008 | Li |
| 2008/0313029 A1 | 12/2008 | Evans |
| 2008/0318559 A1 | 12/2008 | Porco |
| 2009/0049380 A1 * | 2/2009 | Rehling et al. ................ 715/700 |
| 2009/0106126 A1 | 4/2009 | Asano et al. |
| 2009/0171779 A1 | 7/2009 | Shrivathsan et al. |
| 2009/0197582 A1 | 8/2009 | Lewis et al. |
| 2009/0208106 A1 * | 8/2009 | Dunlop et al. ................. 382/173 |
| 2009/0234861 A1 | 9/2009 | Ramer et al. |
| 2009/0254572 A1 * | 10/2009 | Redlich et al. .................. 707/10 |
| 2009/0320059 A1 * | 12/2009 | Bolyukh ......................... 725/32 |
| 2010/0002874 A1 | 1/2010 | Obayashi et al. |
| 2010/0017280 A1 | 1/2010 | Davis et al. |
| 2010/0041422 A1 | 2/2010 | Wormald et al. |
| 2010/0042485 A1 | 2/2010 | Wang et al. |
| 2010/0082435 A1 | 4/2010 | Hartman |
| 2010/0131365 A1 | 5/2010 | Subramanian et al. |
| 2010/0138295 A1 | 6/2010 | Caron et al. |
| 2010/0205049 A1 | 8/2010 | Long et al. |
| 2010/0228611 A1 | 9/2010 | Shenfield |
| 2010/0228617 A1 | 9/2010 | Ransom et al. |
| 2010/0235891 A1 | 9/2010 | Oglesbee et al. |
| 2010/0250351 A1 | 9/2010 | Gillenson et al. |
| 2010/0250368 A1 | 9/2010 | Porco |
| 2010/0274661 A1 | 10/2010 | Aaltonen et al. |
| 2010/0274673 A1 | 10/2010 | Isaac |
| 2011/0029363 A1 | 2/2011 | Gillenson et al. |
| 2011/0040627 A1 | 2/2011 | Brewer et al. |
| 2011/0060651 A1 | 3/2011 | Choi |
| 2011/0178875 A1 | 7/2011 | Dharmaji |
| 2011/0184790 A1 | 7/2011 | Deol Brar et al. |
| 2011/0282900 A1 * | 11/2011 | Lipson et al. ................. 707/769 |

* cited by examiner

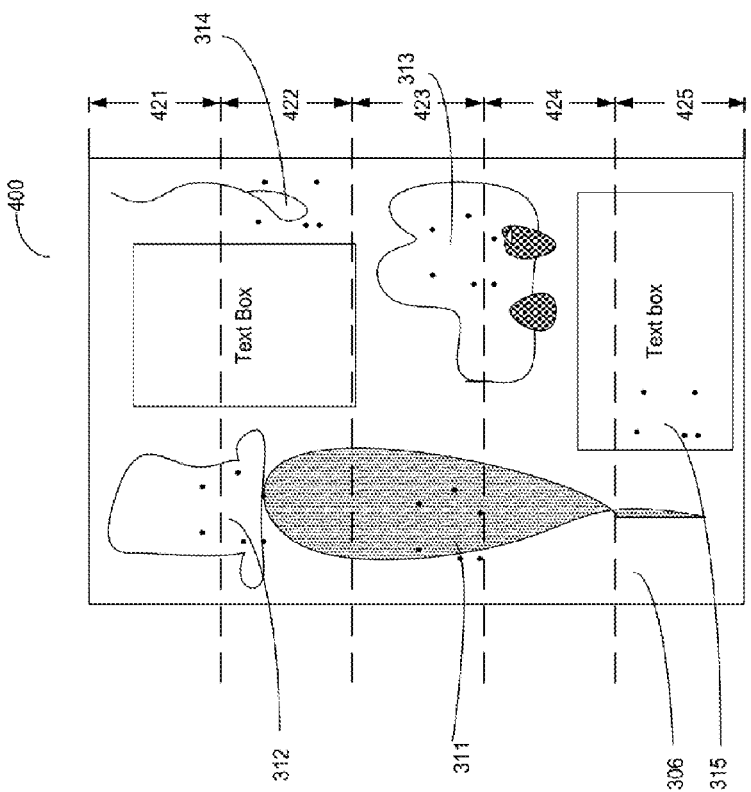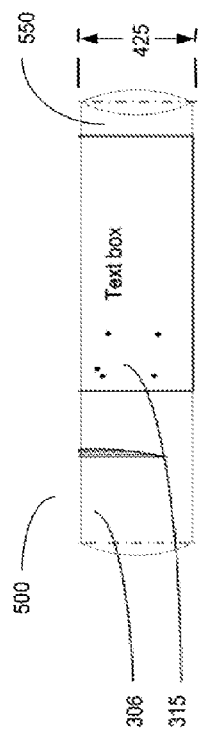
FIGURE 4
FIGURE 5

METHOD AND APPARATUS FOR MAXIMIZING BRAND EXPOSURE IN A MINIMAL MOBILE DISPLAY

CROSS REFERENCE TO RELATED APPLICATIONS

This application is a continuation-in-part of U.S. patent application Ser. No. 13/078,297, filed Apr. 1, 2011, Hot Spot Use in Advertisement, which application claims priority to U.S. patent application Ser. No. 12/368,141, filed Feb. 9, 2009, End-To-End Response Enabling Collection and Use Of Customer Viewing Preference Statistics, which application claims priority to U.S. provisional patent application Ser. No. 61/065,258, filed Feb. 15, 2008, End-To-End Response Enabling Collection and Use Of Customer Viewing Preference Statistics; this application is also a continuation-in-part of the U.S. patent application Ser. No. 12/368,141, filed Feb. 9, 2009, End-To-End Response Enabling Collection and Use Of Customer Viewing Preference Statistics, which application claims priority to U.S. provisional patent application Ser. No. 61/065,258, filed Feb. 15, 2008, End-To-End Response Enabling Collection and Use Of Customer Viewing Preference Statistics, each of which is incorporated herein in its entirety by this reference thereto.

BACKGROUND OF THE INVENTION

1. Technical Field

This invention relates to advertisements (ads) and content viewing on wireless enabled mobile handheld display devices (MHDDs). More specifically, the invention relates to the delivery of large, complex targeted advertisements to MHDDs with the capability for client specific response and feedback to the advertisements to maximize return on investment.

2. Description of the Background Art

The use of MHDDs has been increasing very fast. Such devices are now commonly used for providing selective delivery of focused ads to different target groups of mobile viewers. Such mobile viewer groups (MVGs) are becoming increasingly important and valuable to advertisers as the numbers of such groups continue to increase. There is limited capability of delivering customer and/or group specific ads using specific preferred ad interaction methods to target MVGs today. The ads and the contents thereof must be delivered to the MHDDs of target MVGs, and responses to such ads are collected back, using an interactive call-to-action enabler, such as switches or inserts instantiated on the display of the MHDDs. Methods for delivery of these complex ads are still not optimized for the small MHDD screens.

FIG. 1 is a block schematic diagram showing a prior art instantiation 100 of the call-to-action enablers on the display screen 102 of the MHDD 100 during an ad display, during an ad spot. The call-to-action enablers Click-to-Call, Click-to-Browse, Click-to-Jump page, Click-to-Message, Click-to-Mail, Click-to-Bookmark, Click-to-Share, or Click-to-download are instantiated as switches 111, 112, 113 and as inserts 114, 115. These take up space 105 on the display screen 102, at times more space than the amount of banner space 104 that is available. The use of the space 105 that includes the banner space 104 for the switches 111, 112, 113 and inserts 114, 115 limits the space available for display of the ad 106 to even less than the space 103.

Targeted large display on the MHDD 101 is increasing in number and complexity. Larger ads are being developed to convey fully the inherent messages to the viewing users. Generating and displaying these ads is expensive and, to provide return on these large complex ads, it is necessary to provide maximum exposure to the ad during ad spots by using the full available area of display. It is also advantageous to provide continuous exposure to ads during content viewing so that mind share of the viewer can be captured and the viewer's interest in the ad can be enhanced. Providing the capability for user interaction with the ad during these times is also of utmost importance. Hence, for maximizing return from any ad, it would be advantageous to retain the ability for the full ad to be displayed on screen during ad spots, while keeping the important sections and messages of the ad displayed, during content viewing. It would be further advantageous to provide the customer with some ability to interact with the ad, even during content viewing.

SUMMARY OF THE INVENTION

The delivery of targeted advertisements (ads) to wireless mobile handheld display devices (MHDDs) with client specific advertisement and dynamic content for response and feedback is becoming important in advertising. As the return for ads on MHDDs becomes higher, there is a push to show larger, complex, and more interactive ads on small displays. This has created a need to maximize the area available for ad viewing. The need also exists for increasing the engagement time of the ads. An embodiment of the invention establishes such capability by providing a rolled up ad display where the banner area is used to present a continuously rolling, rolled up ad, which is displayed on the screen at the ad spots by unrolling. Furthermore, the use of transparent hot-spots on the ad allows the whole display screen of the MHDD to be used for presentation of such large and complex ads

BRIEF DESCRIPTION OF THE DRAWINGS

FIG. 4 is a schematic view of a display on an MHDD showing a large ad developed for display with segmentation and showing important features and associated hot-spots for customer interaction according to the invention;

FIG. 5 is a schematic view of a display on an MHDD showing a large ad that is in a rolled up status according to the invention;

DETAILED DESCRIPTION OF THE INVENTION

The delivery of targeted advertisements (ads) to wireless mobile handheld display devices (MHDDs) with client specific advertisement and dynamic content for response and feedback is becoming important in advertising. As the return for ads on MHDDs becomes higher, there is a push to show larger, complex, and more interactive ads on small displays. This has created a need to maximize the area available for ad viewing. The need also exists for increasing the engagement time of the ads. An embodiment of the invention establishes such capability by providing a rolled up ad display where the banner area is used to present a continuously rolling, rolled up ad, which is displayed on the screen at the ad spots by unrolling. Furthermore, the use of transparent hot-spots on the ad allows the whole display screen of the MHDD to be used for presentation of such large and complex ads.

Figure 2:
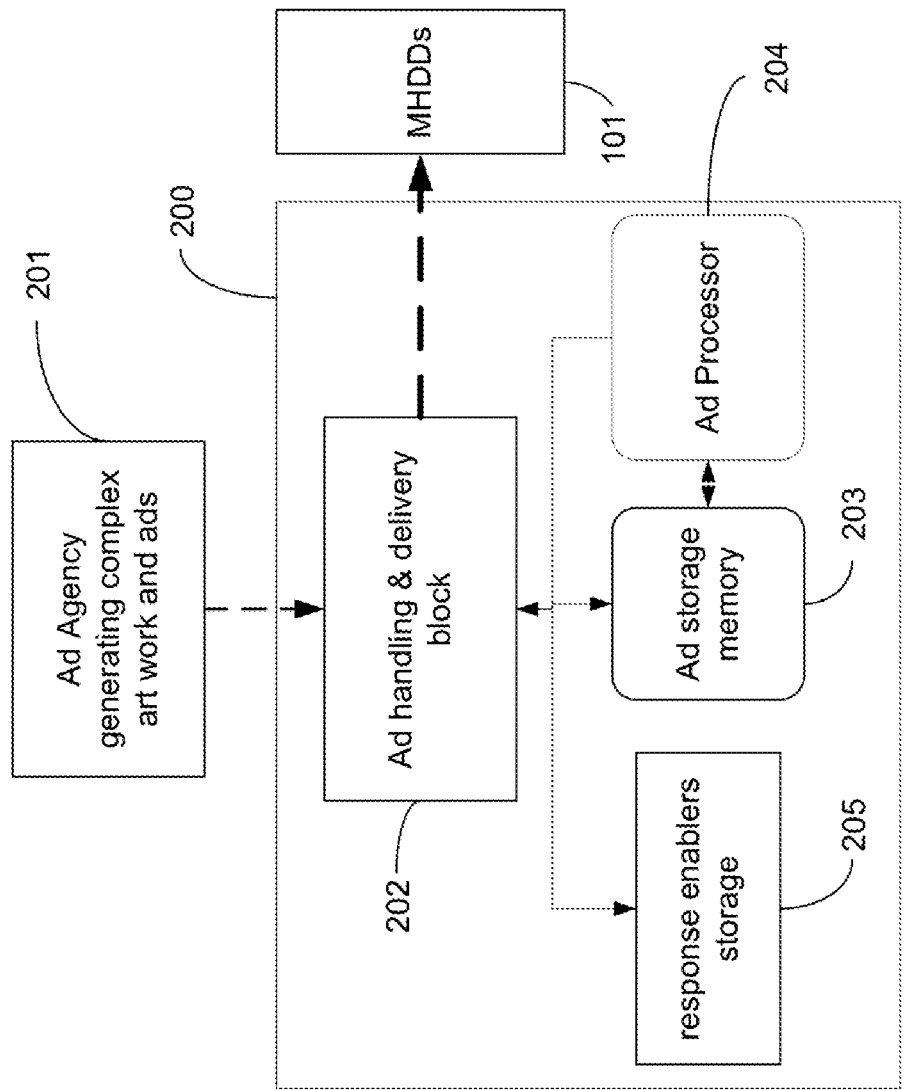
FIG. 2 is a block schematic diagram showing an ad delivery platform for delivering large ads to MHDDs according to the invention.

FIG. 2 is a block schematic diagram showing an ad delivery platform 200 for the delivery of large complex ads and for the viewing of such ads on an MHDD 101. The ad delivery platform 200 receives large, complex ads to be displayed on the MHDDs 101 from the ad agency 201 that generate the complex ads. These ads are received by the ad handling and delivery block 202 and stored in the ad storage memory 203. The ads are supplied to the ad delivery platform with information on the important elements of the ad and the importance/weightage of messages that they convey. This information is also stored in the ad storage memory 203 with the ad.

When an ad is to be provided to the MHDD 101 as part of a campaign, the ad processor 204 on the ad delivery platform 200 processes the received ad from the ad storage memory 203 using the weightage information and assigns transparent hot-spots to the important elements on the ad. The processor 204 also segments the ad into multiple segments that can be displayed in the banner space of the MHDD 101. The segments are also assigned an aggregate weightage by the processor based on the elements in the segments. The ad, along with the segment weightage information and the hotspots, is sent by the processor 204 to the ad delivery block 202 for delivery to the MHDD 101 using any known medium. The ad delivery block 202 also delivers to the MHDD 101 a full set of click-to-action and click-to-animation enablers, which are stored in the response enabler storage 205 of the ad delivery platform 200. The information provided by the ad delivery platform 200 is used with the viewer preferences stored on the MHDD 101 by the processors on the MHDD 101 to generate and implement the full screen ad display and a continuously intractable ad display on the MHDDs 101, as described below.

Figure 1:
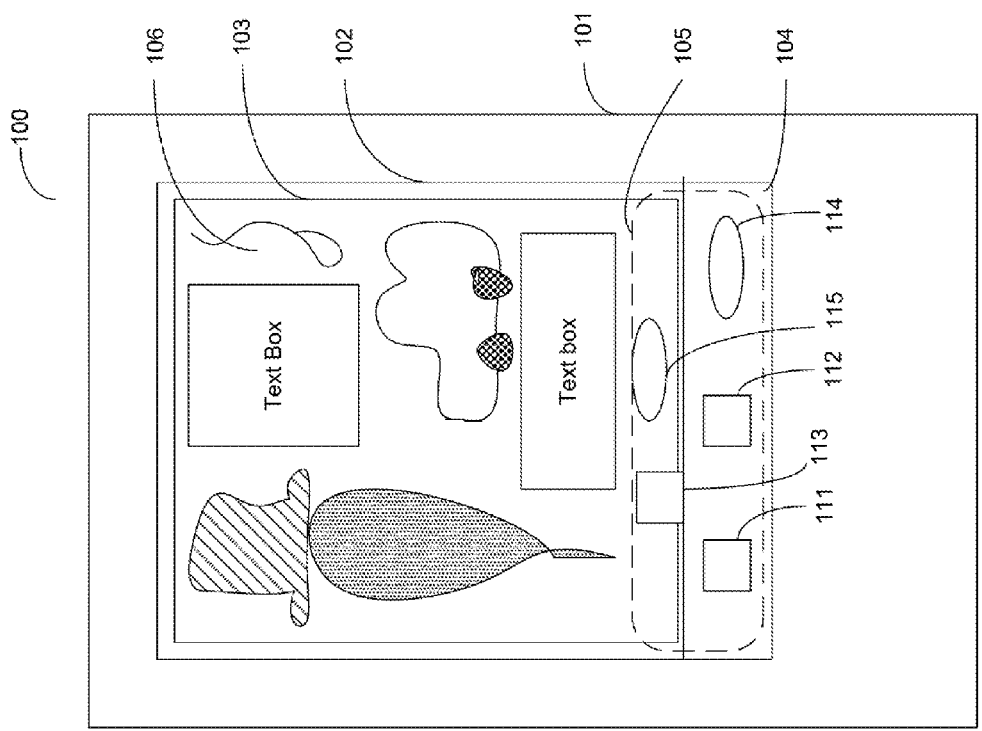
FIG. 1 is a schematic view of a prior art display on an MHDD showing a banner area and additional area taken up by switches and inserts for customer interaction.
Figure 3:
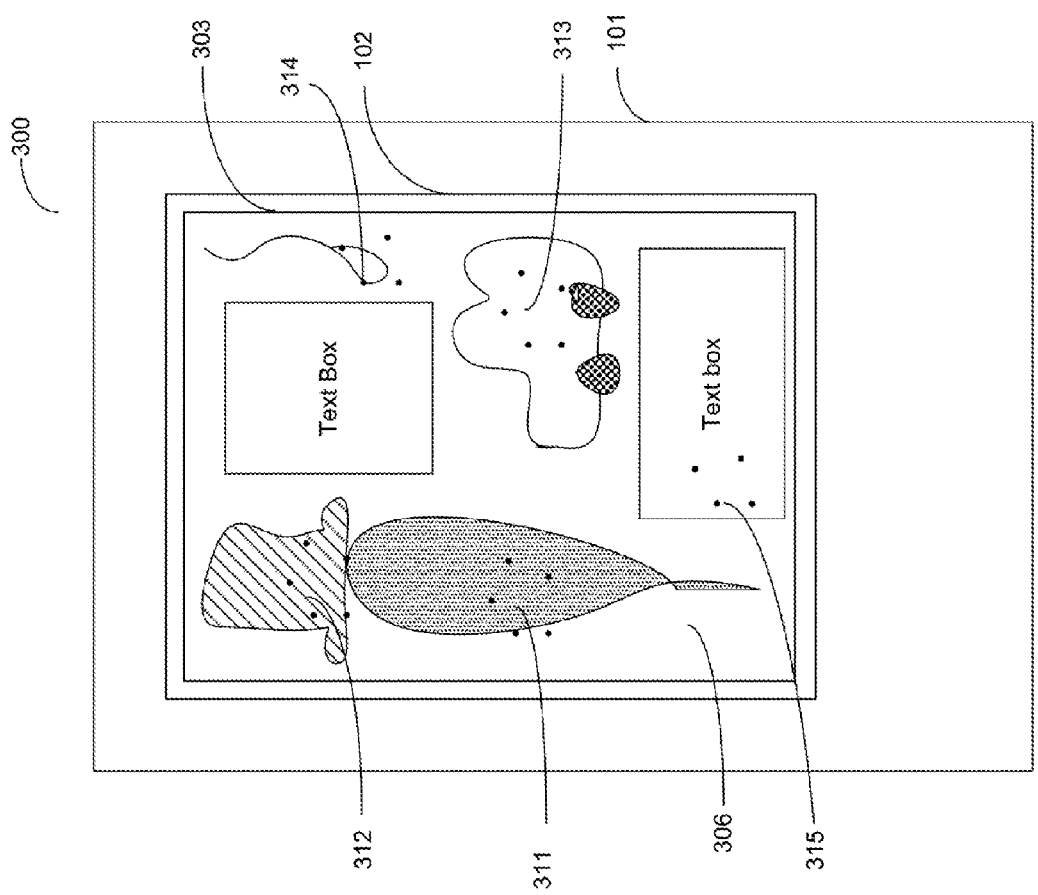
FIG. 3 is a schematic view of a display on an MHDD showing full screen use for ad display during an ad spot with the use of hot-spots or markers enabled within the ad for customer interaction according to the invention.

FIG. 3 is a is a schematic view 300 of a display on an MHDD showing full screen use for ad display during an ad spot with the use of hot-spots or markers enabled within the ad for customer interaction (see parent U.S. patent application s/n TBD, filed TBD, Hot-Spot Use in Advertisement, which application is incorporated herein in its entirety by this reference thereto). An embodiment of the invention enables the use of the maximum available screen area 303 of the display screen 102 for ad 306 display on the MHDD 101 during an ad spot. This is done by assigning the call-to-action enabler capabilities of the MHDD to transparent hot-spots 311, 312, 313, 314, 315 placed over regions of interest on the ad 306 on the display screen 102. The hot-spots are assigned the functions handled by the switches and inserts shown on FIG. 1. This eliminates the need for placing switches 111, 112, 113 and inserts 114, 115 that take up space 104 on display screen 102 for customer interaction. Although this ad display provides the capability for a full screen display, it does not allow retention of even the important regions of the ad, nor does it allow customer interaction capability when there is no ad spot. This limits the time for initiation of customer interaction with any ad displayed.

FIG. 4 is schematic view 400 of a display on an MHDD showing a large ad developed for display with segmentation and showing important features and associated hot-spots for customer interaction. FIG. 4 shows art work, with multiple components comprising text and figures, developed for an ad 306 that conveys a complex message. The generated ad 306 is provided to an ad delivery platform for conversion into a suitable form for display on MHDDs. The ad delivery platform identifies within the ad 306 multiple elements which are important and can result in a call-to-action during viewing. This call-to-action capability is established on the ad 306 by instantiating transparent hot-spots 311, 312, 313, 314, and 315 with assigned call-to-action functionality over the important elements of the ad 306. The established call-to action functionality can include, without limitation, any of Click-to-Call, Click-to-Browse, Click-to-Jump page, Click-to-Message, Click-to-Mail, Click-to-Bookmark, Click-to-Share, and Click-to-download. The hot-spots can be also used for click-to-animation, such as Click-to-Map or Click-to-Video.

To provide for full display of the message on the small available display screen 102, it is necessary to use the whole display screen 102 of the MHDD 101 during ad spots. To present large ads continuously to the consumer, the ad 306 is rolled up and stored in the banner space 104 of the display screen 102 of the MHDD 101. To facilitate this, the ad delivery platform divides the ad 306 into multiple segments 421, 422, 423, 424, 425. The segments are also provided with different weightage based on the importance of the message displayed on each segment 421, 422, 423, 424, and 425.

FIG. 5 is a schematic view 500 of a display on an MHDD showing a large ad that is in a rolled up status 550. The rolled up ad 550 can be made to roll within the banner space 104 to expose various regions or segments 421, 422, 423, 424, or 425 of the ad 306 to the viewer of the MHDD 101 during content viewing in the content display space 103 of the display screen 102 of the MHDD 101.

Figure 6:
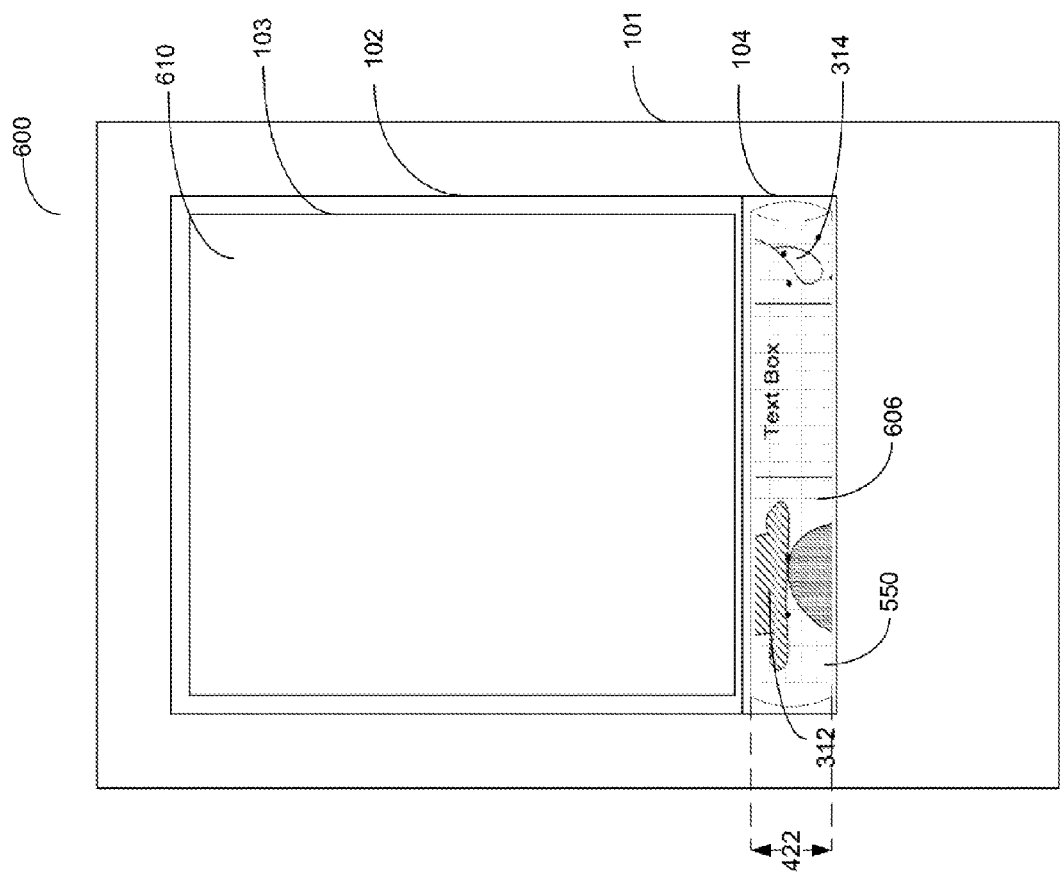
FIG. 6 is a schematic view of a display on an MHDD showing an unrolled ad in the banner space, enabled to roll and expose various ad segments in the banner space at different time durations, with hot-spots for customer interaction during content viewing on the MHDD according to the invention.

As an example, FIG. 6 is a schematic view 600 of a display 102 on an MHDD 101 showing an unrolled ad in the banner space, enabled to roll and expose various ad segments in the banner space at different time durations, with hot-spots for customer interaction during content viewing on the MHDD. In FIG. 6, the rolled up ad 550 is stored in the banner space 104. The rolled up ad 550 displays the segment 422 of the ad 306 with the transparent hot-spot 315 for customer interaction during rolling of the rolled up ad 550. A timer can be allocated on the MHDD to allow a variable time for the display of each segment 421, 422, 423, 424, 425, of the ad 360. This enables different exposure times for the different segments 421, 422, 423, 424, 425 during the rolling of the rolled up ad 550, based on the importance of the expected impact of the message displayed by the segment as provided by the ad delivery platform. This allows the exposure of the ad 306 in the banner area 104 to be optimized to provide maximum impact of the ad 306, even during the content viewing period on the MHDD.

An optimization of the financial return from display of the ad stops the rolling of the ad, as set by the timer, if the cursor is moved over the rolled up ad 550. This allows the content viewing user enough time to initiate a call-to-action. The user can then decide to use any of the transparent hot-spots exposed on the segment currently in view to initiate the call-to-action activity or click-to-animation activity. The click-to-animation activity, such as Call-to-Map or Call-to-Video, which are different from the call-to-action, can be executed in the banner area 104, the content display part 103 of the display screen 102, or in a separate window opened over a portion of the display area 102.

Displaying of the ad 306 can be done in multiple ways using the disclosed invention. For example:

1. The ad remains as a rolled up ad 550 in the banner space 104. Rolling of the rolled up ad 550 displays the ad 306 one segment at a time. Various segments 421, 422, 423, 424, 425 of the ad are displayed for varying times fixed by the timer to achieve maximum impact for the ad 306.
2. The ad display starts as a rolled up ad 550 rolling in the banner space 104 which expands to a partial display, and then the full display on the full display screen 102 of the MHDD 101 by unrolling the ad 306 from the rolled up ad 550.
3. The ad display starts as a completely unrolled ad 306 displayed on the full display screen 102 of the MHDD 101 at the start of ad display, then rolls into a partial ad display, and then to a rolled up ad 550 display, rolling in the banner space 104 of the MHDD at the end of the display.
4. A fully dynamic display, where the rolled up ad 550 stored in the banner space 104 is unrolled to cover the display screen 102 of the MHD 101, and then rolled back into the rolled up ad 550 at the end of the display.

Figure 7:
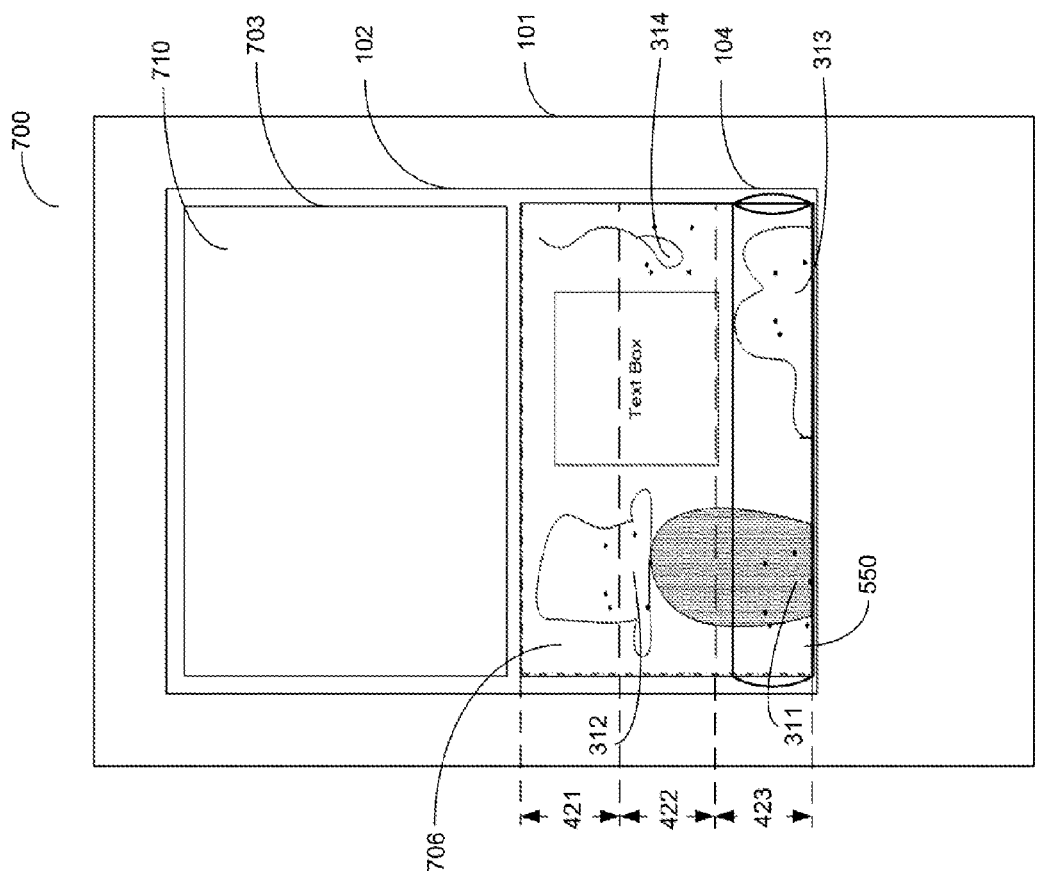
FIG. 7 is a schematic view of a display on an MHDD showing an MHDD with a partially unrolled ad displayed in the banner space during content viewing on the MHDD, with hot-spots on the displayed region for customer interaction according to the invention.

FIG. 7 schematic view 700 of a display on an MHDD showing an MHDD with a partially unrolled ad 706 displayed in the banner space during content viewing on the MHDD, with hot-spots on the displayed region for customer interaction. The partially unrolled ad 706 is unrolled from the rolled up ad 550 in the banner space 104 of the display 102 of the MHDD 101. The response 710 to any customer interaction by a call-to-action can be displayed in the partial content display area 703 of the display screen 102 of the MHDD 101. More and more of the ad segments 421, 422, 423 are exposed sequentially with the hot-spots 311, 312, 313, and 314 inviting the customer to interact with a dynamic ad display.

Figure 8:
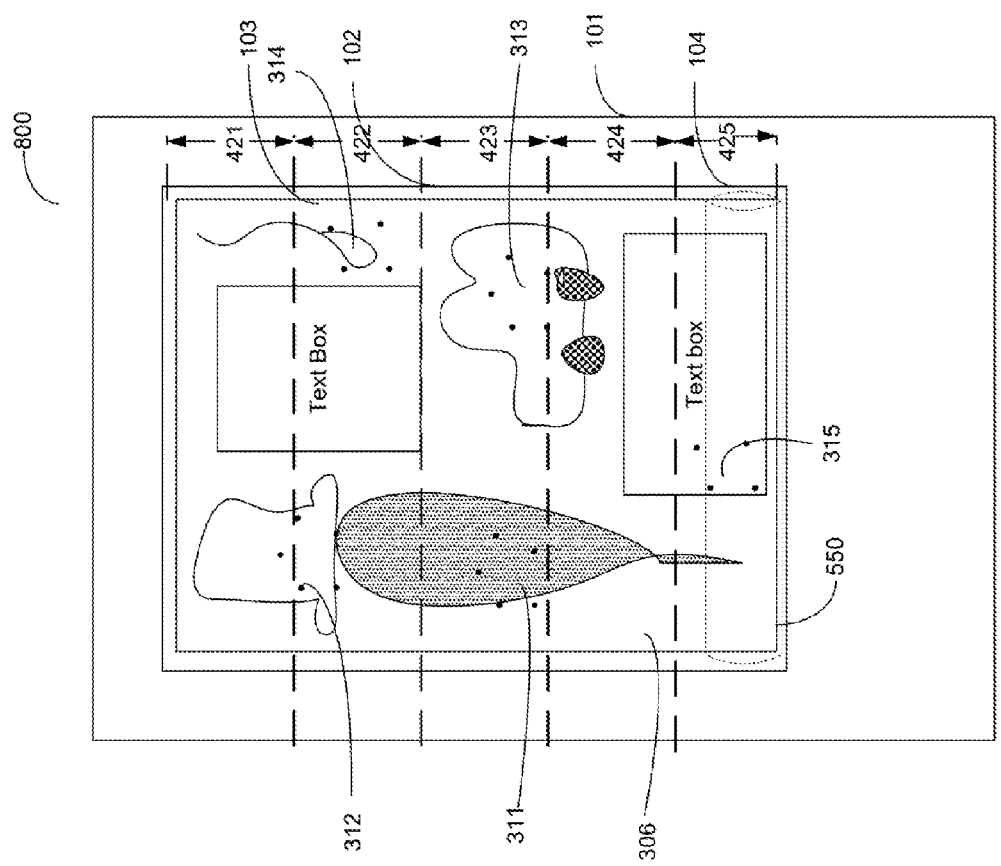
FIG. 8 is a schematic view of a display on an MHDD showing an ad fully unrolled and taking up the total display space on the MHDD, with hot-spots used for customer interaction according to the invention.

FIG. 8 is a schematic view 800 of a display on an MHDD showing an ad fully unrolled and taking up the total display space on the MHDD, with hot-spots used for customer interaction. In FIG. 8, the fully unrolled ad 306 is made up of the segments of the rolled up ad 550 stored in the banner space 104 of the display 102 of the MHDD 101. At this stage, the whole ad with all of the segments 421, 422, 423, 424, 425 is displayed for customer interaction with any of the available hot-spots 311, 312, 313, 314, 315 on the ad 306.

Figure 9:
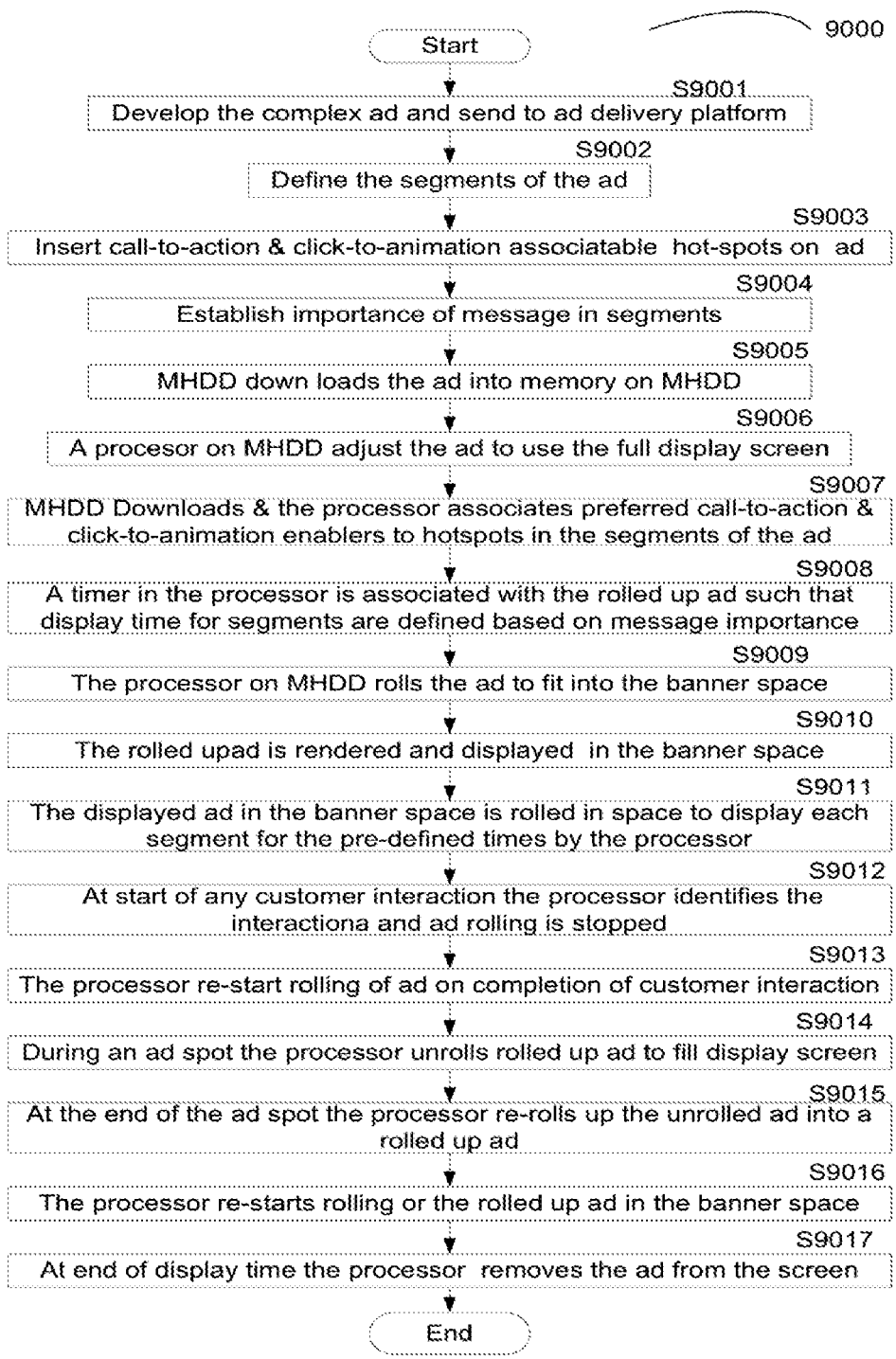
FIG. 9 is a flow chart showing an embodiment of the invention as implemented on an MHDD, and using the MHDDs storage and processor capabilities according to the invention.

FIG. 9 is a flow chart 9000 showing an embodiment of the invention as implemented on an MHDD, and using the MHDDs storage and processor capabilities. The processor that handles the ad download, and rendering and display on the MHDD can be a single central processor on the MHDD, or any one or more of the multiple processors available on the MHDD, as per the software implemented therein.

A complex large ad 306 is generated with multiple elements having messages of varying importance by the ad agency 201 and provided to an ad delivery platform 200 with assigned importance and weightage of the elements for supply to MHDDs (S9001).

The ad processor 204 on the ad delivery platform 200 segments the ad 306 into multiple segments 421-425, such that the segments are each of a size suitable for display in the banner region 104 of an MHDD's display 102 (S9002).

Multiple transparent hot-spots 311-315 that can be associated with call-to-action and click-to-animation are instantiated on the ad 306 at appropriate element locations during ad processing by the ad processor 204 on the ad delivery platform 200 (S9003).

The ad segments 421-425 are each given a different weightage by the ad processor 204 on the ad delivery platform based on the importance of the messages displayed on them (S9004).

The MHDD 101 downloads the ad 306 with all the segmentation information and the hot-spots 421-425 and stores the ad in the memory of the MHDD 101 (S9005).

A processor on the MHDD 101 adjusts the ad size and proportionality of the downloaded ad 306 for full screen display on the display screen 102 of the MHDD 101 (S9006).

The MHDD 101 downloads the call-to-action and click-to-animation enablers from the ad delivery platform 200. The processor on the MHDD 101 chooses the preferred enablers for the content viewer, based on available preference data stored in the memory of the MHDD 101, and associates them with the transparent hot-spots 311-315 on the ad 306 (S9007).

The ad 306 is rolled into a three-dimensional shape as rolled up ad 505 that enables display of the segments 421-425 of the ad 306 in the banner area 104 of the display screen 102 of the MHDD 101 by the processor on the MHDD 101. The three-dimensional rolled up ad 505 is adjusted by the processor to fit into the banner area 104 of the display 102 of the MHDD 101 (S9008).

A timer in the processor on the MHDD 101 is associated with the rolled up ad 505, such that display time for each of the segments 421-425 is defined based on the weightage given to each segment. The weightage is defined based on the importance of the message displayed on the segment in the banner space 104 of the MHDD 101 (S9009).

The rolled up ad 505 is rendered and displayed in the banner space of the MHDD 101 during content viewing time (S9010).

The three-dimensional rolled up ad 505 is rolled using the processor in the banner space 104, such that each segment 421-425 of the ad 306 is displayed for specific time intervals, as set up by the associated timer, in the banner space 104 of the display space 102 of the MHDD 101 (S9011).

The rolling of the rolled up ad 505 is stopped by the processor any time the viewer of the content starts an interaction with the ad by moving a cursor over the banner space 104 of display space 102 of the MHDD 101. This allows the viewer time to complete any interaction or response he wants to make with respect to the ad, using the call-to-action or click-to-animation hot-spots that are on the visible segment of the rolled up ad 505 (S9012).

Once the cursor is moved off the rolled up ad or stopped for a period of time with no further action, the processor on the MHDD 101 recognizes the end of customer interaction with the ad. The processor then re-starts the rolling of the rolled up ad 505, as per the time allocated to display each segment 421-425 of the ad 306 (S9013).

During an ad spot, the rolled up three-dimensional ad is completely unrolled by the processor to fill the display screen 102 of the MHDD 101. At this time, the full ad 306 is displayed with all the hot-spots 311-315 for viewer interaction, as defined by the associated call-to-action or click-to-animation enablers associated with the hot-spot chosen (S9014).

The processor on the MHDD 101 rolls back the ad 306 into the three-dimensional rolled up ad 505 in the banner space 104 of the display space 102 of the MHDD 101 when it recognizes the end of the ad spot on the display screen 102 (S9015).

The processor re-starts the rolling of the rolled up ad 505 in the banner space 104 of the display screen 102 of the MHDD 101 (S9016).

At the end of the display time for the ad 306 the ad rendering and display is stopped by the processor, and the ad 306 is removed from display on the MHDD 101 (S9017).

Even though the ad 306, when rolled up as a rolled up ad 505, is shown as a cylinder, this is not a requirement or limitation. The ad 306 can be rolled into other multisided three-dimensional shapes, such as rectangular, prisms, etc. that can display the segments of the ad as it rolls within the banner area 104 of the display area 102 of the MHDD 101.

An embodiment of the invention enables the presentation of a large complex ad 306 with multiple important concepts and messages on the MHDD 101, effectively using the whole display screen 102 of the MHDD 101 during an ad spot. An embodiment implemented on an MHDD, using the capabilities of the display, the processor, and memory on the MHDD, keeps the interest of the content viewer in the ad during content viewing on the screen 103. This is done by providing a rolling ad 550 in the banner space 104 with call-to-action and click-to-animation capabilities enabled. An embodiment enables adjustment of the exposure time of ad segments 421-425, based on importance of the message delivered. An embodiment provides the capability for continued interaction of the user with the ad 306 using hot-spots 311-315 within the ad space during display of the rolling ad 550 and full ad 306. The continuity of display and engagement provide for increased capture of the mind share of the viewer and, hence, increase return on investment from the ad 306 displayed on the MHDD 101. These and other uses and advantages of the invention will be clear to those in the field of advertising and marketing.

The embodiments disclosed hereinabove is meant for execution on a MHDD. It may be embodied in software, designed to execute on a specific hardware platform, firmware, hardware, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform, such as an additional data storage unit, a display unit, and a printing unit. All or some of the servers maybe combined into one or more integrated servers. Furthermore, a non-transitory computer readable medium is any computer readable medium except for a transitory propagating signal.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method of displaying an advertisement (ad), comprising:
    providing a single ad comprising a plurality of elements conveying a plurality of messages of varying importance;
    splitting said ad into a plurality of segments, wherein each segment is assigned an aggregate weightage based on the elements of the ad that are in that segment, wherein each element is assigned a weightage;
    providing a mobile handheld display device (MHDD) having a display screen;
    dividing said display screen into at least a banner space and a content space;
    adjusting each of said ad segments to individually fit into and fill said banner space; and
    rolling and filling each of said ad segments into said banner space one segment at a time in sequence for display therein for a determined duration wherein each said ad segment starts as rolling in sequence in the banner space, then expands to display each said ad segment, ad segment by ad segment, until all ad segments are displayed on the full display screen of the MHDD.

2. The method of claim 1, wherein each segment of the ad is displayed for particular duration based upon the importance of said ad segment.

3. The method of claim 1, further comprising:
    providing a timer on said MHDD configured for controlling the duration of display of each ad segments in said banner space, wherein different exposure times are selectable for different ad segments based on importance of expected impact of a message displayed by said different ad segments.

4. The method of claim 1, further comprising:
    providing at least one transparent hot-spot on said ad.

5. The method of claim 4, further comprising:
    assigning said ad segments an aggregate weightage based upon one or more elements within said ad segments; and
    using said aggregate weightage to assign transparent hot-spots to important elements on the ad.

6. The method of claim 5, further comprising:
    assigning call-to-action functionality to said transparent hot-spots over regions of interest on the ad.

7. The method of claim 6, wherein said call-to action functionality comprises any of Click-to-Call, Click-to-Browse, Click-to-Jump page, Click-to-Message, Click-to-Mail, Click-to-Bookmark, Click-to-Share, and Click-to-download.

8. The method of claim 5, further comprising:
    assigning click-to-animation functionality to said transparent hot-spots over regions of interest on the ad.

9. The method of claim 8, wherein said click-to-animation functionality comprises any of Click-to-Map and Click-to-Video.

10. An apparatus displaying an advertisement (ad), comprising:
    a processor configured for splitting a single ad comprising a plurality of elements conveying a plurality of messages of varying importance into a plurality of segments, wherein each segment is assigned an aggregate weightage based on the elements of the ad that are in that segment, wherein each element is assigned a weightage;
    a mobile handheld display device (MHDD) having a display screen;
    wherein said display screen is divided into at least a banner space and a content space;

said processor configured to adjust each of said ad segments to individually fit into and fill said banner space; and said processor configured to roll and fill each of said ad segments into said banner space one segment at a time in sequence for display therein for a determined duration wherein each said ad segment starts as rolling in sequence in the banner space, then expands to display each said ad segment, ad segment by ad segment, until all ad segments are displayed on the full display screen of the MHDD.

11. A non-transitory medium having stored thereon program instructions which, when executed by a processor, implements a method of displaying an advertisement (ad), comprising:

providing a single ad comprising a plurality of elements conveying a plurality of messages of varying importance;

splitting said ad into a plurality of segments, wherein each segment is assigned an aggregate weightage based on the elements of the ad that are in that segment, wherein each element is assigned a weightage;

providing a mobile handheld display device (MHDD) having a display screen;

dividing said display screen into at least a banner space and a content space;

adjusting each of said ad segments to individually fit into and fill said banner space; and rolling and filling each of said ad segments into said banner space one segment at a time in sequence for display therein for a determined duration wherein each said ad segment starts as rolling in sequence in the banner space, then expands to display each said ad segment, ad segment by ad segment, until all ad segments are displayed on the full display screen of the MHDD.

* * * * *